Patented Aug. 6, 1940

2,210,548

UNITED STATES PATENT OFFICE 2,210,548

PROCESS OF PURIFYING EDIBLE OILS AND FATS

Jakob L. Jakobsen, Minneapolis, Minn., assignor to General Mills, Inc., a corporation of Delaware No Drawing. Application December 2, 1938, Serial No. 243,621

2 Claims. (Cl. 260—424)

The present invention relates to a process of purifying and refining animal and vegetable oils and fats and more particularly to a process of removing foreign metallic substances therefrom.

The principal object of my invention is to provide a process for removing colloidal or dissolved metals from edible oils and fats thereby producing a pure oil or fat and simultaneously improving the taste of such oil or fat.

Another object of my invention is to provide an acid process for forming salts with the basic components of metallic compounds present in edible oils and fats thus rendering a subsequent alkali treatment more effective because the prior acid treatment removes impurities from the oils or fats which would otherwise be only partially affected by the alkali and which would otherwise remain in the refined oils or fats and unfavorably affect their taste, color and stability.

A further object of my invention is to provide a non-break oil, that is, an oil which will not form a precipitate or become cloudy when heated to a temperature of approximately 300° C. and which may thus be used in varnishes which are subjected to high temperatures.

In practicing my invention, I first take about ½% to 2%, by weight, of concentrated hydrochloric acid and add it to an oil or fat to be purified, preferably at room temperature, and with constant stirring, to provide a thorough mixture. After stirring the mixture for about 30 minutes, an amount of water, in the proportion of about 10 parts of water to 1 part of hydrochloric acid, is added to the acid-oil mixture. This mixture is then stirred for about 15 minutes and then allowed to stand overnight at room temperature. As a result of this treatment, a sludge or precipitate is formed in the acid-oil-water mixture and the sludge and associated watery layer settle to the bottom of a vessel containing the mixture, and the supernatant oil or fat may be removed by any suitable means, such as by syphoning it off.

As a result of the above-described treatment, the acid value of the oil or fat is not materially increased. After being treated as described above, the oil or fat should have sufficient caustic soda solution added to it to neutralize free fatty acids present in the oil or fat and any hydrochloric acid remaining in the oil or fat. As a result of the addition of the alkali, a soap stock is formed in the oil or fat and the oil or fat may be separated therefrom in the usual manner. The oil or fat may be further treated by filtration and bleaching, according to the purpose for which it is to be utilized. For example, if an edible oil or fat is desired, both filtration and bleaching of the oil or fat are essential.

It will, of course, be understood that the above-described treatment of the oil or fat with caustic soda is the conventional procedure, and while desirable in many instances, it forms no part of my invention.

The efficiency of my process may be determined by qualitative and quantitative analysis of the watery layer and the sludge which separates from the oil or fat by the above-described acid treatment. Such analysis shows a substantial removal of metals from the oil or fat in the form of chlorides. As a result of the removal of these metals, the taste, color, and stability of the oil or fat are materially improved.

The following specific example will serve to illustrate and explain my invention. I added 1%, by weight, of concentrated hydrochloric acid to 1500 grams of crude soya bean oil, at room temperature, and stirred it to provide a thorough mixture, for about 30 minutes. I then added about 150 grams of water to the acid-oil mixture and stirred it for about 15 minutes, and I then allowed the mixture to stand overnight at room temperature. As a result of this treatment, a sludge was formed in the oil which was separated therefrom in the usual manner. Analysis of a watery-layer associated with this sludge showed the presence of substantial amounts of the chlorides of aluminum, magnesium, calcium, and iron.

The foregoing detailed description has been given for clearness of understanding only and no unnecessary limitations should be understood therefrom, but it should be construed as broadly as permissible in view of the prior art.

I claim as my invention:

1. A process of purifying and refining animal and vegetable oils and fats and removing colloidal or dissolved metals selected from a group consisting of aluminum, magnesium, calcium, and iron therefrom which comprises adding about ½% to 2%, by weight, of concentrated hydrochloric acid to the oil or fat, stirring the acid with the oil or fat to produce a thorough mixture, and forming a sludge or precipitate therein, then adding an amount of water, in the proportion of about 10 parts of water to about 1 part of hydrochloric acid, to the acid-oil or fat mixture, then stirring the acid-water-oil or fat mixture, and finally allowing the mixture to stand for a sufficient length of time for the sludge or precipitate to separate from the oil or fat.

2. A process of purifying and refining animal and vegetable oils and fats and removing colloidal or dissolved metals therefrom in the form of chlorides of said metals which comprises adding about ½% to 2%, by weight of concentrated hydrochloric acid to said oil or fat, while stirring, whereby the acid reacts with the oil or fat to form a precipitate of chlorides with the metals contained in said oil or fat, then adding an amount of water, in the proportion of about 10 parts of water to about 1 part of hydrochloric acid, to the acid-oil, or fat mixture, stirring the acid-water-oil or fat to provide a thorough mixture, allowing the mixture to stand for a sufficient length of time for the precipitate to separate from the oil or fat, and finally removing the precipitate and water from the oil or fat.

JAKOB L. JAKOBSEN.